UNITED STATES PATENT OFFICE.

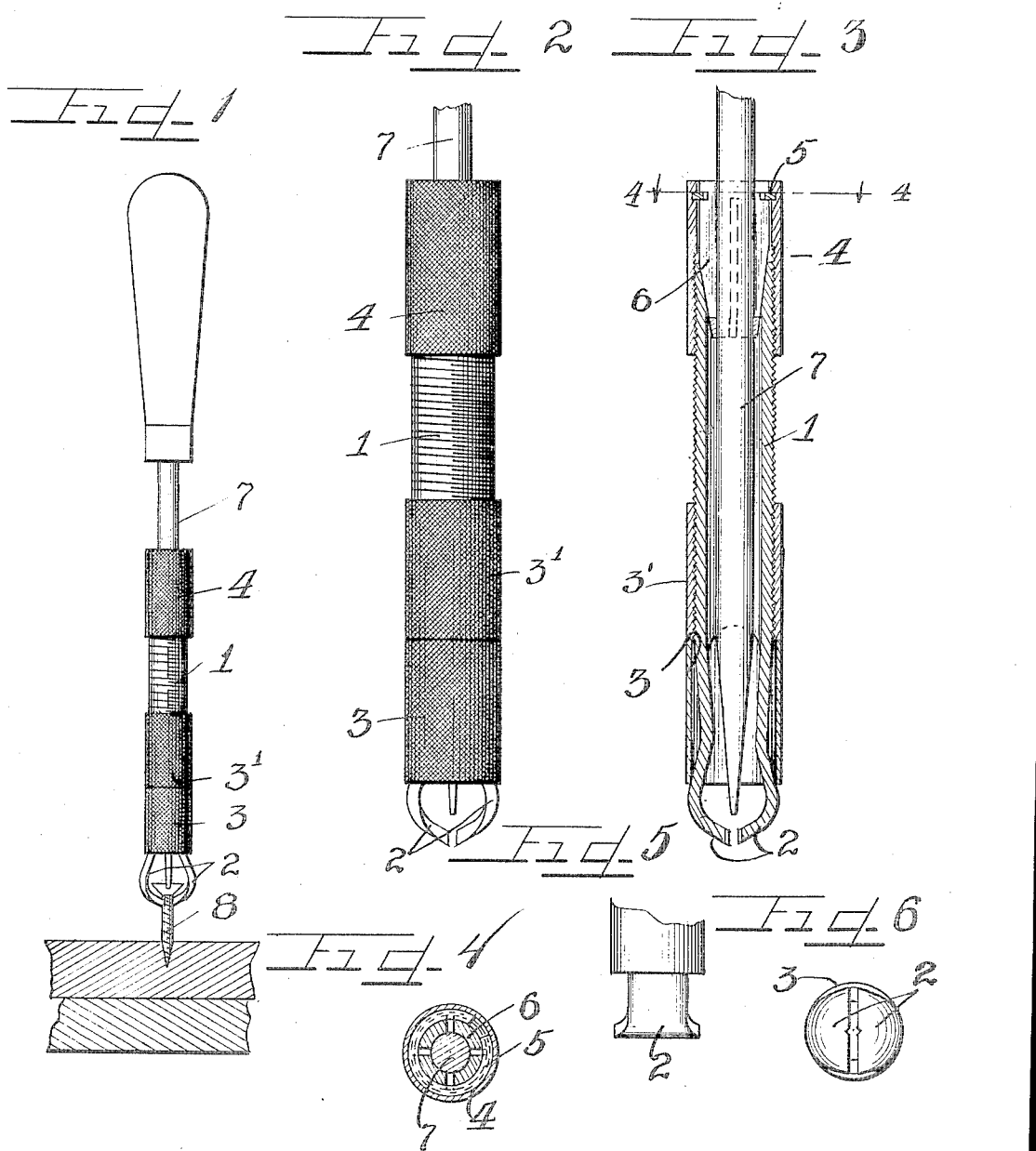

RALPH A. ARMSTRONG, OF ATLANTA, GEORGIA.

SCREW-DRIVER ATTACHMENT.

1,116,532.  Specification of Letters Patent.  Patented Nov. 10, 1914.

Application filed March 14, 1912. Serial No. 683,869.

*To all whom it may concern:*

Be it known that I, RALPH A. ARMSTRONG, a citizen of the United States, and a resident of the city of Atlanta, in the county of Fulton and State of Georgia, have invented certain new and useful Improvements in Screw-Driver Attachments; and I do hereby declare that the following is a full, clear, and exact description of the same, reference being had to the accompanying drawings, and to the numbers of reference marked thereon, which form a part of this specification.

It frequently is necessary to insert screws in positions where it is exceedingly difficult to satisfactorily hold the screw while driving the same with a screw driver. Various devices have been used to obviate the difficulty, but only few of the same have been effective to the extent of permitting the screw to be inserted accurately where desired when the space is such that the hand can not readily be inserted to hold or steady the screw.

The object of this invention is to afford a simple but powerful hand vise, adapted for use independently of, or in connection with, a screw driver, as preferred, and when used in connection with a screw driver, affording means for rigidly holding the screw to permit the same to be guided into place.

It is also an object of the invention to afford a holder adapted for use in connection with a screw driver and through the aid of which, after insertion of the screw point in an object, the screw may be driven independently of any downward pressure exerted by the operator upon the screw driver.

It is an object of the invention also, to afford a device for inserting or removing screws, in which the head has been partly broken away, and to afford a construction of great strength, but extreme simplicity and durability.

The invention embraces many novel features and (in its preferred form) is illustrated in the drawings and hereinafter more fully described.

In the drawings: Figure 1 is a side elevation of a device embodying my invention, showing the same associated with a screw driver and in operative position. Fig. 2 is a similar enlarged view, with the screw removed, and with the screw driver broken away at its upper end. Fig. 3 is a central section of Fig. 2, with the screw driver shank in elevation. Fig. 4 is a section on line 4—4 of Fig. 3. Fig. 5 is a fragmentary view in side elevation, of the holder taken at a right angle with that illustrated in Fig. 2. Fig. 6 is an end elevation of the holder.

As shown in the drawings: 1, indicates a tube of seamless steel of suitable size, that from a point near one end on each side thereof, is cut away or slotted, and the ends thereof on each side the tube are shaped to afford an outward bend, and adapted normally to extend well beyond and in alinement with the sides of the tube, and at their extremities turned inwardly to afford complemental gripping jaws 2. Said tube, from a point corresponding with the beginning of said slot to the other end thereof, is externally threaded, and the end of said tube opposite the jaws is reamed out to afford a long and inward taper. A sleeve 3, which may also be constructed of seamless steel tubing, is bored to a slightly greater diameter than the external diameter of the threaded tube 1, and a second sleeve 3' is threaded upon said tube 1, and when screwed down thereon, and against the sleeve 3, causes the latter to force the jaws 2 inwardly, as shown in Figs. 1 to 3, inclusive. Threaded on the upper end of said threaded tube or shank 1, is a corresponding sleeve 4, the thread whereof extends for approximately half the length upwardly, and the remainder of which is preferably plain. A peripheral groove is provided in the inner side of said sleeve near the upper end thereof, and seated therein is a split ring 5, the inner perimeter of which fits in a corresponding groove around the periphery of a multiple jaw chuck 6, shown in Figs. 3 and 4 as a wedge member, which tapers from near its upper end inwardly of the sleeve 4, and threaded shank 1, the taper thereof being substantially complemental with the inward taper in the end of said threaded shank. As shown, four of said jaws are provided on said chuck, the metallic body of the chuck being longitudinally slotted or quartered to near the extremity thereof to afford resiliency. The central axial aperture through the chuck, is of suitable size to receive the shank 7, of a screw driver therethrough, as shown in Figs. 1, 2 and 3. Each of the jaws 2, as shown, is notched centrally in alinement with the axis of the device to receive the neck of a screw 8, therein, as indicated in Fig. 6.

The operation is as follows: When used in screw setting, the screw driver is inserted into place and firmly gripped therein by means of the chuck 6, which is closed thereon by the rotation of the sleeve 4, on the threaded shank 1, acting to force the jaws of the chuck inwardly into binding engagement with the shank of the screw driver. When the blade of the screw driver is properly positioned to suitably engage in the slot in the head of the screw, as indicated in Fig. 1, the sleeve 3, may be retracted sufficiently on the threaded shank 1, to permit the jaws to move outward sufficiently to permit the insertion of the neck of the screw into place, and when set up with the blade of the screw driver in the slot in the screw head, the screw is firmly held in axial alinement with the tool and driver, and may be very readily driven without necessitating the use of the hand in steadying or holding the screw. The device may be instantly released from the screw by slight retraction of the sleeve 3, permitting the jaws to move apart sufficiently for that purpose, or the sleeve 4, as well as the sleeve 3, may be slightly released, permitting the screw driver to rotate freely independently of the holder, and thus drive the screw head downwardly until the same is driven home. In driving or retracting the screw, one half of the head of which is broken away, it is obvious that the holder acts to firmly hold the neck of the screw, while the pressure of the flat side of the head in the groove against the screw driver will prevent rotation thereof relatively to the screw driver, thus permitting the screw to be either driven or retracted, as preferred. When used as a hand vise, it is obvious that the use thereof is similar to other hand vises, except that owing to the construction described, an exceedingly firm grip may be had upon the object in the holder, thus preventing any tendency to slip. The sleeves may be shaped, formed or milled in any suitable manner to afford a satisfactory grip for the hand to permit the sleeves to be readily actuated in opening or closing the device.

It is to be understood, of course, that details of construction may be varied through a wide range, and, inasmuch as I have shown but one (and that the preferred) form of my invention, I do not purpose limiting the patent to be granted on this application, otherwise than necessitated by the prior art.

I claim as my invention:

1. A device of the class described, embracing an externally threaded screw-driver receiving tube, resilient fingers integral therewith at one end, a sleeve freely slidable on said tube and adapted to be forced into engagement with said resilient fingers to cause them to approach each other, an intermediate sleeve threaded on said tube and adapted by its engagement with said resilient finger sleeve to retain the same in adjusted position against movement away from said resilient fingers, and a sleeve threaded on the other end of said tube and adapted to control means for gripping the screw-driver shank.

2. A device of the class described, embracing an externally threaded screw-driver receiving tube, resilient fingers integral therewith at one end, a sleeve threaded on the other end of said tube, and tapered jaws movable with said sleeve and disposed within said tube, whereby movement of said sleeve on said tube toward said resilient fingers will force said tapered jaws inward to grip a screw-driver shank lying therein.

3. A device of the class described, embracing an externally threaded screw-driver receiving tube, resilient fingers integral therewith at one end, a sleeve freely slidable on said tube and adapted to be forced into engagement with said resilient fingers to cause them to approach each other, an intermediate sleeve threaded on said tube and adapted by its engagement with said resilient finger sleeve to retain the same in adjusted position against movement away from said resilient fingers, a sleeve threaded on the other end of said tube, and tapered jaws movable with said sleeve and disposed within said tube, whereby movement of said sleeve on said tube toward said resilient fingers will force said tapered jaws inward to grip a screw-driver shank lying therein.

In testimony whereof I have hereunto subscribed my name in the presence of two subscribing witnesses.

RALPH A. ARMSTRONG.

Witnesses:
 FRANK W. HOLT, Jr.,
 CHAS. A. DEAN.